United States Patent
Price et al.

(10) Patent No.: US 7,409,823 B2
(45) Date of Patent: Aug. 12, 2008

(54) METHOD AND APPARATUS FOR DELIVERY OF SUPPLEMENTAL MATERIAL TO AN EXHAUST GAS FEEDSTREAM WITH SUPPLEMENTAL AIR ASSISTANCE

(75) Inventors: Kenneth S. Price, Brighton, MI (US); Joseph V. Bonadies, Clarkston, MI (US); John E. Kirwan, Troy, MI (US); David Alexander Goulette, Marine City, MI (US)

(73) Assignee: Delphi Technologies, Inc., Troy, MI (US)

( * ) Notice: Subject to any disclaimer, the term of this patent is extended or adjusted under 35 U.S.C. 154(b) by 338 days.

(21) Appl. No.: 10/880,424

(22) Filed: Jun. 29, 2004

(65) Prior Publication Data

US 2005/0011184 A1 Jan. 20, 2005

Related U.S. Application Data

(60) Provisional application No. 60/483,692, filed on Jun. 30, 2003.

(51) Int. Cl.
*F01N 3/10* (2006.01)

(52) U.S. Cl. .............................. 60/307; 60/276; 60/280; 60/286; 60/295; 60/297; 60/303; 422/172; 422/182

(58) Field of Classification Search .................. 60/274, 60/275, 276, 280, 289, 286, 295, 297, 303, 60/307; 422/170, 171, 172, 177, 182
See application file for complete search history.

(56) References Cited

U.S. PATENT DOCUMENTS

| | | | | |
|---|---|---|---|---|
| 4,747,264 A | | 5/1988 | Santiago et al. | |
| 5,042,248 A | | 8/1991 | Abthoff et al. | |
| 5,852,927 A | * | 12/1998 | Cohn et al. | 60/780 |
| 5,894,728 A | * | 4/1999 | Wakamoto | 60/286 |
| 6,293,097 B1 | | 9/2001 | Wu et al. | |
| 6,393,832 B1 | * | 5/2002 | Kolmanovsky et al. | 60/286 |
| 6,560,958 B1 | * | 5/2003 | Bromberg et al. | 60/275 |
| 6,574,956 B1 | | 6/2003 | Moraal et al. | |
| 6,647,724 B1 | * | 11/2003 | Arnold et al. | 60/608 |
| 6,702,991 B1 | * | 3/2004 | Smaling et al. | 422/186.21 |
| 6,729,124 B2 | * | 5/2004 | Baeuerle et al. | 60/285 |
| 6,832,473 B2 | * | 12/2004 | Kupe et al. | 60/286 |
| 6,843,054 B2 | * | 1/2005 | Taylor et al. | 60/275 |

(Continued)

OTHER PUBLICATIONS

Sobris—Servotech On Board Reductant Injection System—sales brochure Aug. 30, 2002.

*Primary Examiner*—Tu M Nguyen
(74) *Attorney, Agent, or Firm*—Paul L. Marshall

(57) ABSTRACT

A method and system for introducing supplemental material to an exhaust aftertreatment device, including: a delivery system, an air pump operable to input pressurized air to the delivery system, and a turbosupercharger of an internal combustion engine operable to deliver pressurized air to an inlet of the air pump. The supplemental material introduced to the exhaust aftertreatment device is pressurized by the pressurized air input from the air pump, and the air inlet to the air pump is pressurized by the turbosupercharger for the internal combustion engine. The delivery system uses existing pressurized air generated within the engine system from the turbosupercharger to supplement air pressure supplied to the turbine-style air pump used by the delivery system. The supplemental material may comprise ammonia, hydrogen, carbon monoxide, or urea.

16 Claims, 2 Drawing Sheets

U.S. PATENT DOCUMENTS

| | | | |
|---|---|---|---|
| 6,895,746 B2 * | 5/2005 | Buglass et al. | 60/286 |
| 6,928,807 B2 * | 8/2005 | Jacob et al. | 60/286 |
| 2003/0056498 A1 | 3/2003 | Kuenstler et al. | |
| 2003/0226350 A1 * | 12/2003 | Liu | 60/275 |
| 2004/0020447 A1 * | 2/2004 | Taylor et al. | 123/3 |

* cited by examiner

METHOD AND APPARATUS FOR DELIVERY OF SUPPLEMENTAL MATERIAL TO AN EXHAUST GAS FEEDSTREAM WITH SUPPLEMENTAL AIR ASSISTANCE

RELATED APPLICATIONS

This patent application claims priority to and all advantages of U.S. Provisional Patent Application No. 60/483,692 which was filed on Jun. 30, 2003.

TECHNICAL FIELD

This invention pertains generally to exhaust aftertreatment systems for internal combustion engine control systems, and more specifically to introduction of supplemental materials into exhaust aftertreatment systems.

BACKGROUND OF THE INVENTION

Manufacturers of compression-ignition engines incorporate exhaust aftertreatment systems to meet requirements of various emissions regulations and to address customer satisfaction issues. Emissions regulations implemented in countries throughout the world include standards for allowable levels of exhaust gas constituents output as a result of combustion of fuel in an internal combustion engine. The primary regulated exhaust gas constituents include hydrocarbons ('HC'), carbon monoxide ('CO'), nitrides of oxygen ('NOx'), and carbon particulate matter ('PM'). Engine manufacturers meet various emissions regulations by designing engines, engine control systems and exhaust aftertreatment devices to reduce NOx to nitrogen ('$N_2$') and oxygen ($O_2$), and oxidize HC, CO, and PM to water ('$H_2O$') and carbon dioxide ('$CO_2$'). Compression-ignition engines operating at lean air/fuel ratios typically have low engine-out emissions of CO and HC, and higher levels of engine-out emissions of NOx and PM.

Engine system designers reduce NOx emissions and PM of compression-ignition engines using several different aftertreatment devices and control schemes. The aftertreatment devices include, for example, NOx adsorber catalysts, diesel particulate filter devices ("DPF"), oxidation and three-way catalysts, and selective catalytic reduction catalysts. The aftertreatment devices are placed in an exhaust gas feedstream for use in conjunction with engine management control schemes to reduce engine-out and tailpipe emissions below regulated levels. Each aftertreatment device typically has a preferred set of operating parameters over which it operates optimally. When the exhaust gas feedstream is outside the optimal range of operating parameters for a specific aftertreatment device, emissions performance may be adversely affected.

Engine system designers implement various systems to ensure the exhaust gas feedstream from the engine is within an optimal range of operating parameters for each aftertreatment device. One system is a delivery system that introduces a supplemental material into the exhaust gas feedstream upstream of the aftertreatment device. Supplemental materials typically include diesel fuel, ammonia ($NH_3$), or aqueous urea. Diesel fuel is injected into the exhaust feedstream to shift the exhaust air/fuel ratio to stoichiometry or rich of stoichiometry. Added diesel fuel in the exhaust causes an exothermic reaction and increased temperature in the aftertreatment system. Increased temperature facilitates regeneration of DPF devices and desulfation of NOx adsorber catalysts. A shift in air/fuel ratio typically facilitates desorption of NOx from a catalyst surface, and leads to conversion to nitrogen ($N_2$), oxygen ($O_2$), and water ($H_2O$). Ammonia or aqueous urea is injected into the exhaust feedstream to enhance and improve conversion of NOx to $N_2$ in a selective catalyst reduction device.

A system for delivering supplemental material to an exhaust gas feedstream typically comprises an injecting device, a fluid delivery system, and an air pressurizing system. The fluid delivery system typically comprises a fluid reservoir containing supplemental material and a fluid conduit for delivering the supplemental material to the injecting device. The air pressurizing system typically comprises an air pump or air compressor whose output is connected to the injecting device. An injecting device typically comprises a metering device wherein the pressurized air from the air pump and the supplemental material are mixed and delivered to a nozzle placed in the exhaust system for dispersal into the exhaust gas feedstream.

An internal combustion engine may be described as an air-pumping device, wherein fresh air is drawn into the engine through an intake system and pushed out through the exhaust system. Backpressure is a term that describes resistance to airflow through the exhaust system. The magnitude of backpressure increases as components are added to the exhaust system for emissions control and noise abatement. Designers must understand and accommodate a range of backpressure levels over the entire range of engine operation when determining operating requirements for a delivery system for supplemental materials. The air pressurizing system of the delivery system must effectively pressurize the delivery system at high speed, high load, and high exhaust backpressure conditions and at low speed, low load, and low exhaust backpressure conditions. Designers have proposed air pressure systems that incorporate a conventional turbine-style pump to pressurize the air for use with the delivery system. However, a typical turbine-style pump may lack the dynamic range and capacity to deliver sufficient level of air pressure and flow of supplemental material at high speed, high load, and high backpressure conditions. Designers have proposed the use a high-pressure, positive-displacement pump with capacity to operate over the entire range of backpressure for a given system. A high-pressure, positive-displacement pump typically adds significant cost, mass and power consumption to a system, and is rarely used at its maximum capacity.

Therefore, what is needed is a pump for an air pressuring system for a system that delivers supplemental material to an exhaust gas feedstream that is capable of meeting the performance requirements for high speed, high load, and high backpressure operation, without incurring the costs associated with a high-pressure, positive-displacement pump.

SUMMARY OF THE INVENTION

The present invention provides an improvement over conventional delivery systems by using existing pressurized air generated within the engine system from a turbocharger or supercharger (hereinafter 'turbosupercharger') to supplement air pressure supplied to the turbine-style air pump used by the delivery system. The invention includes a method and system for introducing supplemental material to an exhaust gas feedstream upstream of an exhaust aftertreatment device of an internal combustion engine, including the delivery system operable to introduce supplemental material, an air pump operable to input pressurized air to the delivery system, and a turbosupercharger for the internal combustion engine operable to deliver pressurized air to an inlet of the air pump. The supplemental material introduced to the exhaust aftertreatment device is pressurized by the pressurized air input from the air pump, and the air inlet to the air pump is pressurized by the turbosupercharger for the internal combustion engine. The system preferably includes an electronic controller, operable to monitor input from at least one sensing device, and determine a quantity of the supplemental material to be introduced to the exhaust gas feedstream, based upon input from the at least one sensing device. The controller controls the delivery system for the supplemental material, the air pump and the turbosupercharger such that the quantity of the supplemental material required to be introduced to the exhaust gas feedstream is substantially completely introduced.

The invention leads to increased injection pressure of the delivery system without increasing the size of the turbine pump or replacing the turbine pump with a more expensive pump. The present invention results in reduced pump component cost and a lower fuel economy impact on the vehicle due to lower electrical power consumption, compared to conventional delivery systems for supplemental materials. A further advantage of the embodiment includes using pressurized air from in front of a pre-cooler, to gain higher temperature air, which assists in vaporization and injection of the supplemental material into the exhaust gas feedstream.

During engine operation, as engine speed or load is increased the flow rate of the exhaust increases, resulting in increased backpressure at the injection point. As exhaust flow rate increases, the turbosupercharger increases in speed resulting in increased air pressure at the intake manifold. By supplying the inlet to the air pump with pressurized air from the turbosupercharger, the pump is capable of boosting the injection pressure of the supplemental material to compensate for the increased backpressure without the use of a larger turbine pump, or a positive displacement compressor. At low speed/load operation the engine intake air pressure is low and the required injection pressure is low, and the required boost by the air pump is minimal. As the speed/load of the engine increases, the intake air pressure to the engine increases at the same time the required pressure increases, due to the backpressure of the exhaust system. In this condition, the required boost function of the air pump is minimal due to elevated inlet air pressure of the turbosupercharger, requiring less effort to inject the supplemental material than if it were drawing from atmospheric air. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
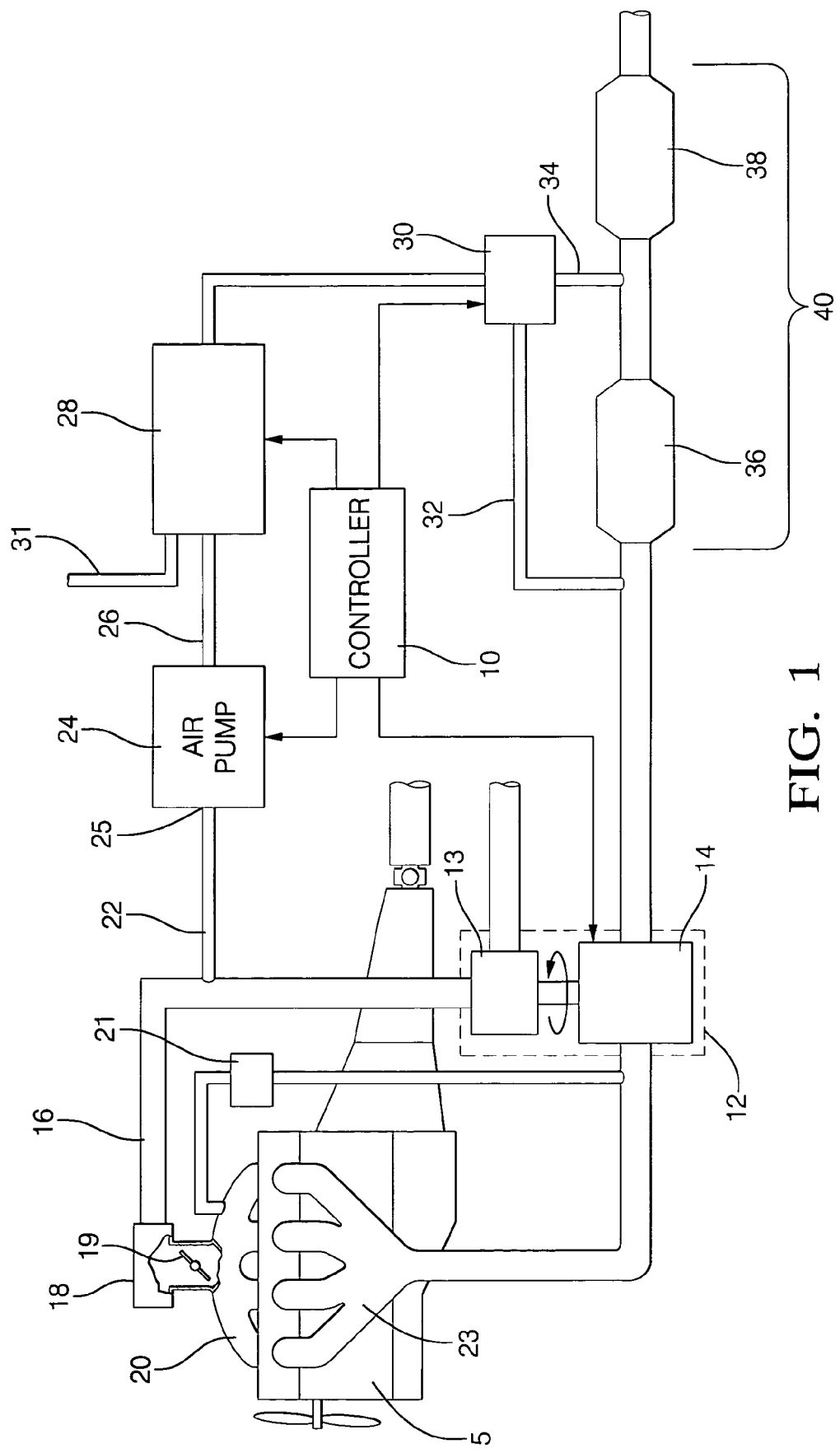
FIG. 1 is a schematic diagram, in accordance with a first embodiment of the present invention; and, FIG. 2 is a schematic diagram, in accordance with a second embodiment of the present invention.

Referring now to the drawings, wherein the showings are for the purpose of illustrating the invention only and not for the purpose of limiting the same, FIG. 1 shows a schematic diagram of an internal combustion engine 5 with an exhaust aftertreatment system 40, a delivery system including device 28, and an electronic controller 10 which has been constructed in accordance with an exemplary embodiment of the present invention.

The invention comprises a system and a method to introduce supplemental material into an exhaust gas feedstream of the internal combustion engine, preferably upstream of the exhaust aftertreatment system 40. The internal combustion engine 5 in this exemplary embodiment is a compression-ignition engine that operates primarily lean of stoichiometry, and may be used on light-duty, medium-duty, and heavy-duty applications. The engine 5 includes a plurality of cylinders (not shown), and a plurality of fuel injectors (not shown), wherein each said fuel injector is operable to deliver fuel to one of the plurality of cylinders. There is preferably an exhaust gas recirculation ('EGR') system 21 that is operable to recirculate exhaust gas from the exhaust manifold 23 to the air intake manifold 20 of the engine 5. This embodiment preferably includes a turbosupercharger 12 mechanized in the exhaust system to provide pressurized air into the intake manifold 20. Filtered air enters the compressor 14 of the turbosupercharger 12. The filtered air passes through an outlet of the compressor 14 under pressure and passes through a first conduit 16 to an intercooler 18, across a throttle device 19 and into the intake manifold 20 for ingestion into the engine 5. The engine 5 is mechanized with sensors (not shown) signally connected to the controller 10 that are capable of measuring engine performance and an operator's demand for power. The controller 10 is operable to control the plurality of fuel injectors, EGR system 21, the turbosupercharger 12, and other output devices based upon input from the sensors (not shown). The mechanization of a compression-ignition internal combustion engine is known to one skilled in the art.

Referring again to FIG. 1 the exhaust aftertreatment system 40 downstream of the exhaust manifold 23 and the turbosupercharger 12 may be comprised of a single aftertreatment device, or any of a variety of combinations of aftertreatment devices or elements, depending upon engine and emissions regulations for which the engine 5 and aftertreatment system 40 is designed to meet. The exhaust aftertreatment system 40 is preferably designed to catalyze and filter the exhaust gas feedstream flowing out of the engine 5 and through the exhaust manifold 23. The exemplary aftertreatment system 40 shown in FIG. 1 includes a catalyzed diesel particulate filter 36 in series with a NOx adsorber catalyst 38. The exhaust aftertreatment system preferably includes sensors (not shown) operable to monitor various exhaust gas feedstream parameters, for example, exhaust temperature, air/fuel ratio, exhaust gas constituent concentration, or backpressure. Each of the sensors is signally connected to the controller 10. Aftertreatment systems and sensors, including diesel particulate filters 36 and NOx adsorber catalysts 38 and other devices, are known to one skilled in the art.

The controller 10 is preferably an electronic control module comprised of a central processing unit signally electrically connected to volatile and non-volatile memory devices via data buses (not shown). The controller 10 is signally electrically connected to each of the aforementioned engine and exhaust aftertreatment sensors. The controller 10 is operably connected to various output devices, including the plurality of fuel injectors, the turbosupercharger 12, the EGR system 21, an air pump 24, and device 28, including a control valve 30. The controller 10 collects information from the aforementioned engine and exhaust aftertreatment sensors to determine the engine performance parameters and operator demand for power, and controls the output devices using control algorithms and calibrations that are internal to the controller 10. The control algorithms are typically executed during preset loop cycles such that each control algorithm is executed at least once each loop cycle. A loop cycle is typically repeatedly executed each 3, 6, 15, 25 or 100 milliseconds during ongoing engine operation. In this embodiment of the invention, the controller is operable to control the device 28 in conjunction with operation of other output devices, based upon predetermined algorithms and calibrations and inputs from the aforementioned sensors. Design and application of the controller 10 to control the operation of the internal combustion engine 5 and to monitor the exhaust aftertreatment system is well known to one skilled in the art.

Referring again to FIG. 1, the invention includes a system operable to inject supplemental material into the exhaust gas feedstream, in accordance with the present invention. The system includes the air pump 24, wherein an output of the air pump is fluidly connected and delivered to device 28 through a conduit 26. Liquid fuel is supplied via a second input 31 to the device 28. The device 28 in this embodiment comprises a reformer operable to prepare supplemental material, typically a reformate, from the supplied fuel and air. Reformate is introduced into the exhaust gas feedstream to heat or regenerate one or more of the elements of the exhaust aftertreatment system 40. Fuel reformers and reformate are known to one skilled in the art. In this embodiment, the device 28 delivers supplemental material into the exhaust gas feedstream in front of the DPF 36 and the NOx adsorber 38 using control valve 30 operably controlled by the controller 10. The device 28 of this embodiment may comprise any one of a number of fuel reformers operable to prepare and deliver supplemental material to the exhaust gas feedstream. Design of the device 28 is dependent upon the supplemental material used and the required quantity of flow, among other factors.

A portion of the pressurized air that passes through the outlet of the compressor 14 and through conduit 16 to the intake manifold 20 is routed through a second conduit 22 and inlet to the air pump 24. The outlet of the air pump 24 is input to the device 28 via conduit 26, wherein the air is utilized by the device 28. In this embodiment, the supplemental material, in the form of reformate, from the device 28 is input to the control valve 30. The controller 10 uses the control valve 30 to control flow of the supplemental material into the exhaust gas feedstream upstream of the DPF 36 through a first conduit and nozzle 32 and into the exhaust gas feedstream upstream of the NOx adsorber 38 through a second conduit and nozzle 34.

The air pump 24 includes an air inlet 25 that receives pressurized air from the compressor 14 of the turbosupercharger 12 through conduit 22 that is pneumatically connected to the first conduit 16 between the outlet of turbosupercharger 12 and the intake manifold 20, preferably upstream of the intercooler 18. This mechanization causes a portion of the compressed air that is output from the air compressor 14 to be inlet to the air pump 24 through the air inlet 25.

The air pump 24 preferably comprises a turbine-style air pump driven by an electric motor that is operably connected to the controller 10. The air pump 24 with pressurized inlet air preferably pumps a sufficient quantity of pressurized air into the device 28 to overcome backpressure in the exhaust system 40 over the range of expected exhaust system backpressures over which the engine 5 operates. The air pump 24 with pressurized inlet air enables injection of supplemental material into the exhaust gas feedstream at sufficient pressure levels to be effective. The air pump 24 is sized according to flow parameters of the exhaust gas feedstream, the range of anticipated exhaust backpressures, the requirements of the device 28, and pressure at the air inlet. Design and application of turbine-style air pumps is known to one skilled in the art.

The control valve 30 preferably comprises an air flow control valve operable to control flow of air and supplemental material to the exhaust gas feedstream, via conduit 34. The supplemental material is introduced to the exhaust gas feedstream upstream of the exhaust aftertreatment system 40. Control valves are known to one skilled in the art.

Figure 2:
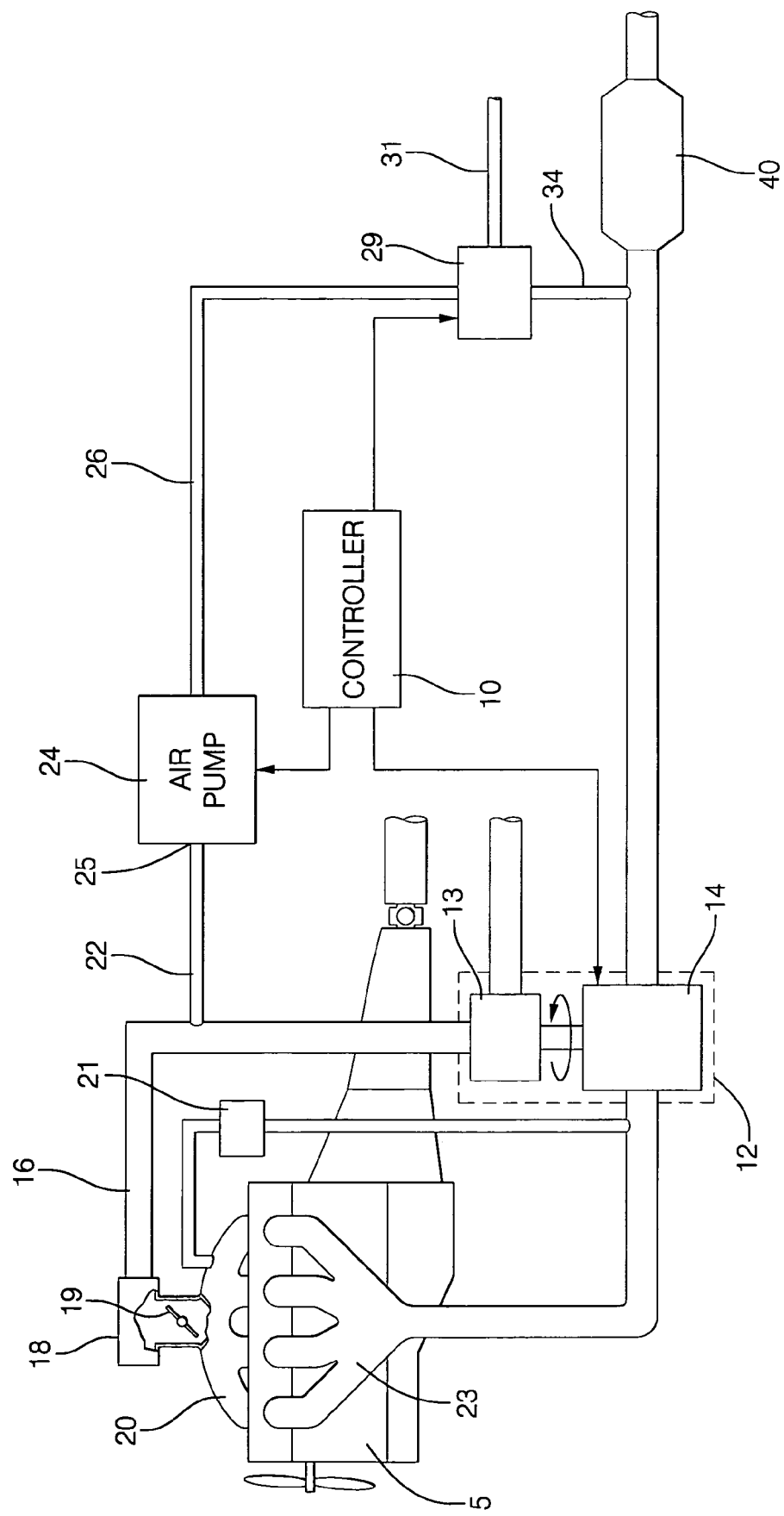

Referring now to FIG. 2, a second embodiment of the invention is now disclosed. It should be noted that reference numerals used in common with FIG. 1 refer to elements that are common between the first and second embodiments. FIG. 2 shows a schematic diagram of the internal combustion engine 5 with the exhaust aftertreatment system 40, an air-assisted injector 29, and the electronic controller 10 which has been constructed in accordance with this embodiment of the present invention.

The air-assisted injector 29 receives pressurized air input from the air pump 24 via conduit 26, and is controlled by the controller 10, as previously described in reference to the first embodiment. The air-assisted injector 29 also receives input of liquid fuel or reformate via conduit 31, and outputs supplemental material to the exhaust gas feedstream via conduit 34. Air-assisted injectors 29 are known to one skilled in the art.

Selection of the supplemental material used is dependent upon the specific exhaust aftertreatment device employed and the emissions regulations the system is being designed to meet. The various types of supplemental materials used are known to one skilled in the art, and may include aqueous urea, diesel fuel, or ammonia.

Although the embodiments described detail an application of the system on a compression ignition engine, it is understood that the invention applies to delivery systems used on any internal combustion engine employed to introduce supplemental materials into an exhaust gas feedstream, including direct-injection spark ignition engines, homogeneous charge compression-ignition engines, and others. It is understood that the invention applies to supplemental material delivery systems for all forms and combinations of exhaust aftertreatment devices, including by way of example particulate filters, non-thermal plasma devices, NOx adsorbers, catalytic converters and others. It is understood that the invention applies to various systems for pressurizing intake air, including for example, turbochargers with waste gate controls, or with variable geometry turbines, or with supplemental electrical assistance, or superchargers, or others.

The invention has been described with specific reference to a specific embodiment and modifications thereto. Further modifications and alterations may occur to others upon reading and understanding the specification. It is intended to include all such modifications and alterations insofar as they come within the scope of the invention.

The invention claimed is:

1. A system for introducing a supplemental material comprising reformate material from a reformer to an exhaust gas stream from an internal combustion engine, comprising:

a device operable to introduce the supplemental material to the exhaust gas stream downstream of the engine;

an air pump operable to input pressurized air to the device; and a turbosupercharger for the internal combustion engine operable to deliver pressurized air to an inlet of the air pump;

wherein the supplemental material introduced to the exhaust gas stream is pressurized by the pressurized air input from the air pump; and wherein air inlet to the air pump is pressurized by the turbosupercharger of the internal combustion engine; and further comprising an electronic controller that is operable to monitor input from at least one sensing device comprising a differential pressure sensor, that is operable to determine a quantity of the supplemental material to be introduced to the exhaust gas stream based upon input from the at least one sensing device, and that is operable to control the device, the air pump and the turbosupercharger, such that the quantity of the supplemental material to be introduced to the exhaust gas stream is substantially completely introduced.

2. The system of claim 1 wherein the device operable to introduce the supplemental material to the exhaust gas stream comprises an air-assisted injector.

3. A system for introducing supplemental material to an exhaust gas stream from an internal combustion engine, comprising:
a device operable to introduce the supplemental material to the exhaust gas stream downstream of the engine;
an air pump operable to input pressurized air to the device;
a turbosupercharger for the internal combustion engine operable to deliver pressurized air to an inlet of the air pump; and
an electronic controller operable to monitor input from at least one sensing device comprising a differential pressure sensor;
wherein the supplemental material introduced to the exhaust gas stream is pressurized by the pressurized air input from the air pump; and
wherein air inlet to the air pump is pressurized by the turbosupercharger of the internal combustion engine; and further comprising
an electronic controller that is operable to monitor input from at least one sensing device comprising a differential pressure sensor, that is operable to determine a quantity of the supplemental material to be introduced to the exhaust gas stream based upon input from the at least one sensing device, and that is operable to control the device, the air pump and the turbosupercharger, such that the quantity of the supplemental material to be introduced to the exhaust gas stream is substantially completely introduced.

4. The system of claim 3, wherein the supplemental material comprises urea.

5. The system of claim 3, wherein the exhaust aftertreatment device comprises a diesel particulate filter.

6. The system of claim 3, wherein the exhaust aftertreatment device comprises a NOx adsorber catalyst.

7. The system of claim 3, wherein the exhaust aftertreatment device comprises an oxidation catalyst.

8. The system of claim 3, wherein the at least one sensing device comprises an exhaust gas sensor.

9. The system of claim 3, wherein the device operable to introduce the supplemental material to the exhaust gas stream introduces the supplemental material to the exhaust gas stream such that the supplemental material affects operation of an exhaust aftertreatment device.

10. The system of claim 3, wherein the device operable to introduce the supplemental material to the exhaust gas stream comprises a reformer.

11. The system of claim 10, wherein the reformer is operable to generate supplemental material comprising at least one material selected from the group consisting of ammonia, hydrogen, and carbon monoxide.

12. The system of claim 3, wherein the device operable to introduce the supplemental material to the exhaust gas stream comprises an air-assisted injector.

13. The system of claim 12, wherein the supplemental material comprises fuel.

14. The system of claim 12, wherein the supplemental material comprises reformate material from a reformer.

15. A system for introducing reformate to an exhaust gas stream from an internal combustion engine, comprising:
a reformer operable to introduce the reformate to the exhaust gas stream downstream of the engine;
an air pump operable to input pressurized air to the reformer; and
a turbosupercharger for the internal combustion engine operable to deliver pressurized air to an inlet of the air pump;
wherein the reformate is pressurized by the pressurized air input from the air pump; and
wherein air inlet to the air pump is pressurized by the turbosupercharger of the internal combustion engine; and further comprising
an electronic controller that is operable to monitor input from at least one sensing device comprising a differential pressure sensor, that is operable to determine a quantity of the supplemental material to be introduced to the exhaust gas stream based upon input from the at least one sensing device, and that is operable to control the device, the air pump and the turbosupercharger, such that the quantity of the supplemental material to be introduced to the exhaust gas stream is substantially completely introduced.

16. The system of claim 15, wherein the supplemental material comprises at least material selected from the group consisting of ammonia, hydrogen, and carbon monoxide.

* * * * *